Figure 1:
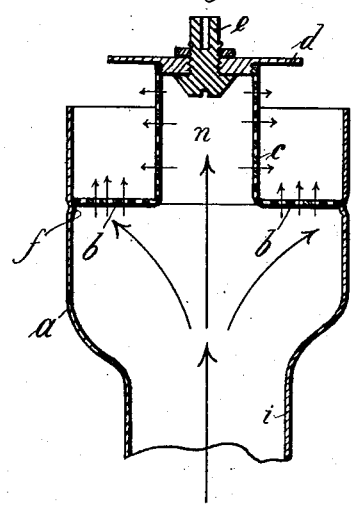

No. 739,934. PATENTED SEPT. 29, 1903.
W. H. A. & W. C. A. SIEVERTS.
INCANDESCENT GAS LIGHT BURNER.
APPLICATION FILED DEC. 9, 1902.
NO MODEL.

WITNESSES
H. M. Kuehne
J. M. Dowling

INVENTORS:
Wilhelm Henrich August Sieverts
Wilhelm Christian August Sieverts
By Richardson
ATTORNEYS

THE NORRIS PETERS CO., PHOTO-LITHO., WASHINGTON, D. C.

No. 739,934. Patented September 29, 1903.

UNITED STATES PATENT OFFICE.

WILHELM HEINR. AUG. SIEVERTS AND WILHELM CHRISTIAN AUG. SIEVERTS, OF HAMBURG, GERMANY.

INCANDESCENT GAS-LIGHT BURNER.

SPECIFICATION forming part of Letters Patent No. 739,934, dated September 29, 1903.

Application filed December 9, 1902. Serial No. 134,542. (No model.)

*To all whom it may concern:*

Be it known that we, WILHELM HEINRICH AUGUST SIEVERTS and WILHELM CHRISTIAN AUGUST SIEVERTS, citizens of the Empire of Germany, residing at Hamburg, in the State of Hamburg, Empire of Germany, have invented a new and useful Incandescent Gas-Light Burner, of which the following is a specification.

Our invention relates to improvements in incandescent gas-light burners whereby the illuminating power of the latter is considerably increased; and the objects of our improvement are, first, to provide an annular perforated disk in the burner on or near its mouth; second, to provide a central perforated vertical tube above said annular perforated disk and adjoining to same, and, third, to provide a burner-disk covering said tube, whereby a chamber is formed, the said burner-disk being arranged for carrying the glowing-socket bearer. The annular perforated disk may be shaped in various manners. It may be plain or arched or of a downwardly-converging conical shape. The part of the burner beneath the annular perforated disk may be of the usual construction, either with a simple chamber for the gas and air mixture coming from the pipe below or with a separate air-chamber for fresh air in addition to the chamber for the gas and air mixture. In the former case the gas and air mixture is divided into two parts, of which the one is allowed to pass under its own pressure vertically through the perforations of the annular disk, while the other part accumulates in the chamber inside the perforated tube and becomes so strongly heated by the burner-disk as to forcibly escape through the perforations of the tube and meet with the vertical current. In the latter case—*i. e.*, in the burner with an air-chamber in addition to the chamber for the gas and air mixture—the chamber inside the perforated tube is closed at the bottom and connected with the air-chamber by two or several tubes or channels. Then the whole of the gas and air mixture will pass vertically through the perforations of the annular disk, while the fresh air admitted into the air-chamber and preliminarily heated therein will pass through the tubes or channels into the chamber inside the perforated tube, where it accumulates and becomes strongly heated before it forcibly escapes through the perforations of the tube and meets with the vertical current. In both cases the effect will be the same, the current escaping from the tube-perforations, violently drawing the vertical current and carrying the same along with it upward, so that the illuminating power of the burner is greatly increased.

Our invention is illustrated in the accompanying drawings, in which—

Figure 2:
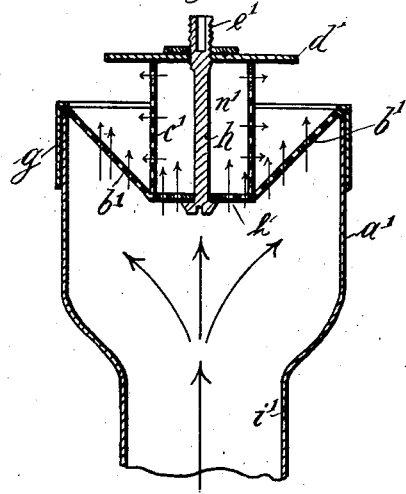
Figure 3:
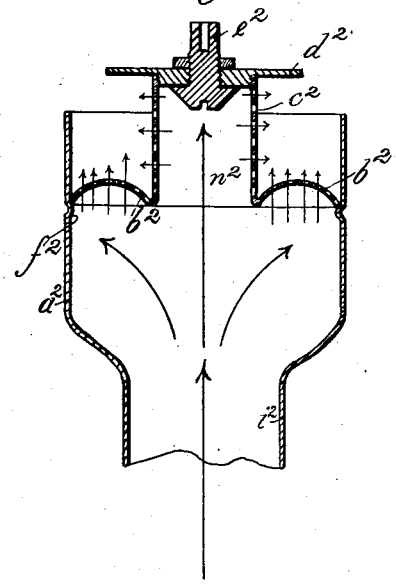
Figure 4:
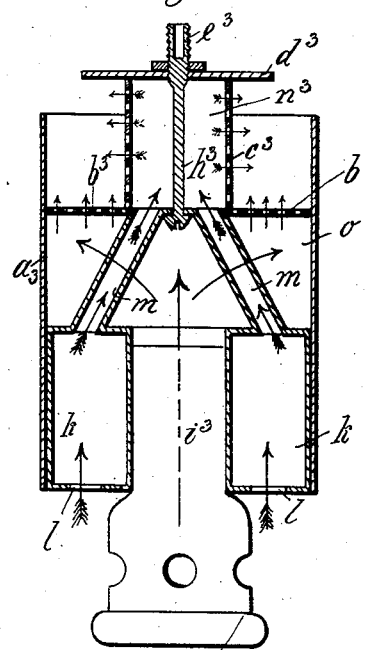

Figure 1 is a vertical central section, on an enlarged scale, through an incandescent gas-light burner having an even annular perforated disk. Fig. 2 is a similar section, on an enlarged scale, through a similar burner having a conical annular perforated disk. Fig. 3 is a similar section through a burner having an arched annular perforated disk; and Fig. 4 is a vertical central section, on an enlarged scale, through an incandescent gas-light burner having an even annular perforated disk and a separate air-chamber.

In the burner shown in Fig. 1 an even annular perforated disk $b$ is secured in the casing $a$ at a certain distance below the mouth of the latter. On the disk $b$ a perforated tube $c$ is placed, which is covered by an overtopping burner-disk $d$, so that a chamber $n$ is formed within the tube $c$. The burner-disk $d$ is provided with a screw $e$ or its equivalent for carrying the glowing-socket bearer. (Not shown.)

The burner shown in Fig. 2 is provided with a perforated disk $b'$, which is plain in its central part and conical in its annular part. The disk $b'$ is made to rest on the mouth of the casing $a'$ and is there secured by a cup $g$, fitting closely over the casing $a'$. The perforated tube $c'$ is made separate and secured between the disk $b'$ and the burner-disk $d'$ by means of a bolt $h$, the head of which bears against the disk $b'$ and the threaded end $e'$ of which is screwed into a corresponding female thread of the burner-disk $d'$. The end $e'$ is hollow and serves for carrying the glowing-socket bearer. The central part of the disk $b'$ is provided with perforations $h^4$ to allow of a part of the gas and air mixture passing from the chamber below into the chamber $n'$.

The burner shown in Fig. 3 is substantially the same as that shown in Fig. 1 only that the annular perforated disk $b^2$ is arched. Its parts are marked by the same letters, with the addition of the index 2.

From an examination of Figs. 1 to 3 it will be evident that the gas and air mixture coming from the mixing-tube $i$, $i'$, or $i^2$, respectively, is divided into two parts, of which the one is allowed to pass vertically through the perforations of the disk $b$ $b'$ or in the annular part of the disk $b^2$, respectively, at a comparatively slow velocity, while the other part accumulates in the chamber $n$, $n'$, or $n^2$, respectively, where it becomes so strongly heated by the burner-disk $d$, $d'$, or $d^2$ that it escapes at a great velocity through the tube-perforations, and on meeting with the vertical current it will violently draw and carry the same along with it upward. The effect of this will be to accelerate the introduction of the gas and air mixture from the mixing-tube and to increase the supply of oxygen sucked with the air into the mixing-tube $i$, $i'$, or $i^2$, respectively. Herein lies the reason for the increase of the illuminating power of the burner as in opposition to other known incandescent gas-light burners.

The burner shown in Fig. 4 is provided with an air-chamber $k$, which surrounds the mixing-tube $i^3$. The air-chamber $k$ has at the bottom a series of apertures $l$ for the admittance of fresh air. At the cover the air-chamber $k$ is connected by several tubes $m$ with the heating-chamber $n^3$, formed by the perforated tube $c^3$, the burner-disk $d^3$, and the central part of the disk $b^3$. The construction of these parts is substantially the same as in Fig. 2. The whole of the gas and air mixture contained in the chamber $o$ is caused by its pressure to pass through the perforations in the annular part of the disk $b^3$ upward in a vertical direction and at a comparatively slow velocity. The air entering the air-chamber $k$ through the apertures $l$ is heated to a certain degree by the radiation of the heat emitted from the light before the air passes through the tubes $m$ into the chamber $n^3$, where it becomes so strongly heated as to escape at a great velocity horizontally through the tube-perforations and meets with the vertical current, which it violently draws and carries along with it upward. As stated in the introductory part, the illuminating power of this burner is equal to that of the burners shown in Figs. 1 to 3.

The annular perforated disk $b$, $b'$, $b^2$, or $b^3$, respectively, may be made to rest on a shoulder of the casing, such as $f$ in Fig. 1 and $f^2$ in Fig. 3, or it may be secured in the casing by soldering or otherwise, or it may rest on the edge of the casing and be secured by a cap $g$, as is shown in Fig. 2. It is immaterial whether the disk be made in one piece with the perforated tube, as in Figs. 1 and 3, or separate, as in Fig. 2. In Fig. 4 the disk $b^3$ is assumed to fit closely into the casing $a^3$ and to be connected with the tubes $m$ by soldering.

What we claim as our invention, and desire to secure by Letters Patent, is—

1. The combination with a burner-tube, of a perforated disk arranged in the upper part thereof, a vertical perforated central tube upon said disk and adjoining the same and an imperforate burner-disk covering the said tube and projecting laterally from the central tube, substantially as described.

2. In an incandescent gas-light burner, the combination with a burner-tube, a perforated disk arranged in the upper burner part, of a vertical perforated tube resting on the central part of said disk, a burner-disk covering the upper mouth of said tube, and a bolt for uniting said three parts and serving for carrying the glowing-socket bearer.

3. In an incandescent gas-light burner, the combination with a burner-tube, a mixing-tube, a disk perforated in its annular part and arranged in the upper burner part, of a vertical perforated tube resting on the central part of said disk, a burner-disk covering said tube and provided with a hollow screw for carrying the glowing-socket bearer, an air-chamber surrounding the mixing-tube and provided at the bottom with a plurality of apertures for admitting fresh air, and a plurality of channels connecting said air-chamber at its top with the air-heating chamber formed by the central part of said disk, said perforated tube and said burner-disk.

In testimony whereof we have signed our names to this specification in presence of two subscribing witnesses.

WILHELM HEINR. AUG. SIEVERTS.
WILH. CHRISTIAN AUG. SIEVERTS.

Witnesses:
E. H. L. MUMMENHOFF,
OTTO W. HELLMRICH.